(12) United States Patent
Hsu et al.

(10) Patent No.: US 11,021,025 B2
(45) Date of Patent: Jun. 1, 2021

(54) TIRE ASSEMBLING DEVICE

(71) Applicant: GIANT MANUFACTURING CO., LTD., Taichung (TW)

(72) Inventors: Wei-Tsung Hsu, Taichung (TW); Che-Wei Hsu, New Taipei (TW); Wei-Han Tseng, Hsinchu (TW)

(73) Assignee: GIANT MANUFACTURING CO., LTD., Taichung ( * ) Notice: Subject to any disclaimer, the term of this patent is extended or adjusted under 35 U.S.C. 154(b) by 216 days.

(21) Appl. No.: 15/942,570

(22) Filed: Apr. 2, 2018

(65) Prior Publication Data
US 2018/0290508 A1    Oct. 11, 2018

(30) Foreign Application Priority Data

Apr. 6, 2017   (TW) .................................. 106111583

(51) Int. Cl.
*B60C 25/04*          (2006.01)
(52) U.S. Cl.
CPC .................................. *B60C 25/04* (2013.01)
(58) Field of Classification Search
CPC ....... B60C 25/01; B60C 25/015; B60C 25/02; B60C 25/04
USPC .......................................................... 157/1.3
See application file for complete search history.

(56) References Cited

U.S. PATENT DOCUMENTS

| | | | | |
|---|---|---|---|---|
| 1,025,987 A | * | 5/1912 | Long | B60C 25/04 157/1.22 |
| 1,183,690 A | * | 5/1916 | Stewart | B60C 25/04 157/1.22 |
| 1,587,634 A | * | 6/1926 | Dickey | B60C 25/04 157/1.22 |
| 2,226,757 A | * | 12/1940 | Ewell | B60C 25/02 157/1.3 |
| 7,556,078 B1 | * | 7/2009 | Bassett | B60C 25/04 157/1.22 |

* cited by examiner

*Primary Examiner* — Hadi Shakeri
(74) *Attorney, Agent, or Firm* — CKC & Partners Co., LLC

(57) ABSTRACT

A tire assembling device includes a main body, a holding portion, an abutting surface, a guiding portion, a pressing portion and a protrusion. The main body has a top surface. The holding portion is connected to one side of the main body. The abutting surface connected to another side of the main body is for abutting against a rim surface of the rim. The guiding portion located between the abutting surface and the top surface is extended inclinedly corresponding to a radial direction of the rim. The pressing portion extended from the guiding portion toward a reference direction is protruded from the abutting surface and connected to the top surface. The protrusion protruded from the pressing portion forms a hook portion with an upper edge of the pressing portion and the abutting surface. The hook portion is for hooking a first edge of the rim.

10 Claims, 7 Drawing Sheets

TIRE ASSEMBLING DEVICE

RELATED APPLICATIONS

This application claims priority to Taiwan Application Serial Number 106111583, filed Apr. 6, 2017, which is herein incorporated by reference.

BACKGROUND

Technical Field

The present disclosure relates to a tire assembling device. More particularly, the present disclosure relates to a tire assembling device for installing a tubeless tire.

Description of Related Art

In recent years, riding bicycle has become popular, and many riders spend lots of time to repair or maintain their bicycles. Consequently, simple maintenance of bicycle has become a basic skill for many riders. A tire of a bicycle must be removed or installed when repaired or changed. However, tubeless tires have a tire bead thicker than conventional tires owning to airtight requirements, which results in inconvenience during installation.

A conventional way to manually install a tubeless tire requires much power. In addition, when using a tire lever to assist installation, the tire bead or an airtight layer of the tire bead will be easily damaged because the friction causing from the tire lever. For the tubeless tire, any damage of the tire bead will cause leak to affect the performance of the tire; as a result, using such tire lever to assist installation of the tubeless is unsuitable. Therefore, for a person of the art, how to develop a tire assembling device for tubeless tires becomes an important issue.

SUMMARY

The present disclosure provides a tire assembling device which is for installing a tire on a rim. The tire assembling device includes a main body, a holding portion, an abutting surface, a guiding portion, a pressing portion and a protrusion. The main body has a top surface located at a top side of the main body. The holding portion is connected to one side of the main body. The abutting surface is connected to another side of the main body and for abutting against a rim surface of the rim. The guiding portion is located between the abutting surface and the top surface, and the guiding portion is extended inclinedly corresponding to a radial direction of the rim. The pressing portion is extended from the guiding portion toward a reference direction, and the pressing portion is protruded from the abutting surface and connected to the top surface. The protrusion is protruded from the pressing portion and forming a hook portion with an upper edge of the pressing portion and the abutting surface. The hook portion is for hooking a first edge of the rim. When the tire assembling device is hooked on the first edge of the rim by the hook portion and is moved toward a predetermined direction along the first edge, the guiding portion guides a tire bead of the tire toward the radial direction of the rim, and the pressing portion pushes the tire bead toward a normal direction of the abutting surface to guide the tire to be installed on the rim.

The present disclosure provides another tire assembling device which is for installing a tire on a rim. The tire assembling device includes a main body, a holding portion, an abutting surface, a guiding portion, a hook portion and a pressing portion. The main body has a top surface located on a top side of the main body. The holding portion is extended from one side of the main body toward a reference direction. The abutting surface is located at another side of the main body and for abutting against a rim surface of the rim. The guiding portion is located at one end of the main body. The hook portion is located between the abutting surface and the top surface, and the hook portion is for hooking a first edge of the rim. The pressing portion is disposed at the main body and located between the hook portion and the guiding portion. The pressing portion is for providing a force, and a direction of the force is parallel to a normal direction of the abutting surface. When the tire assembling device is hooked on the first edge of the rim by the hook portion and is moved toward a predetermined direction along the first edge, the guiding portion guides a tire bead of the tire toward a radial direction of the rim, and the pressing portion pushes the tire bead toward the normal direction of the abutting surface to guide the tire to be installed on the rim.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
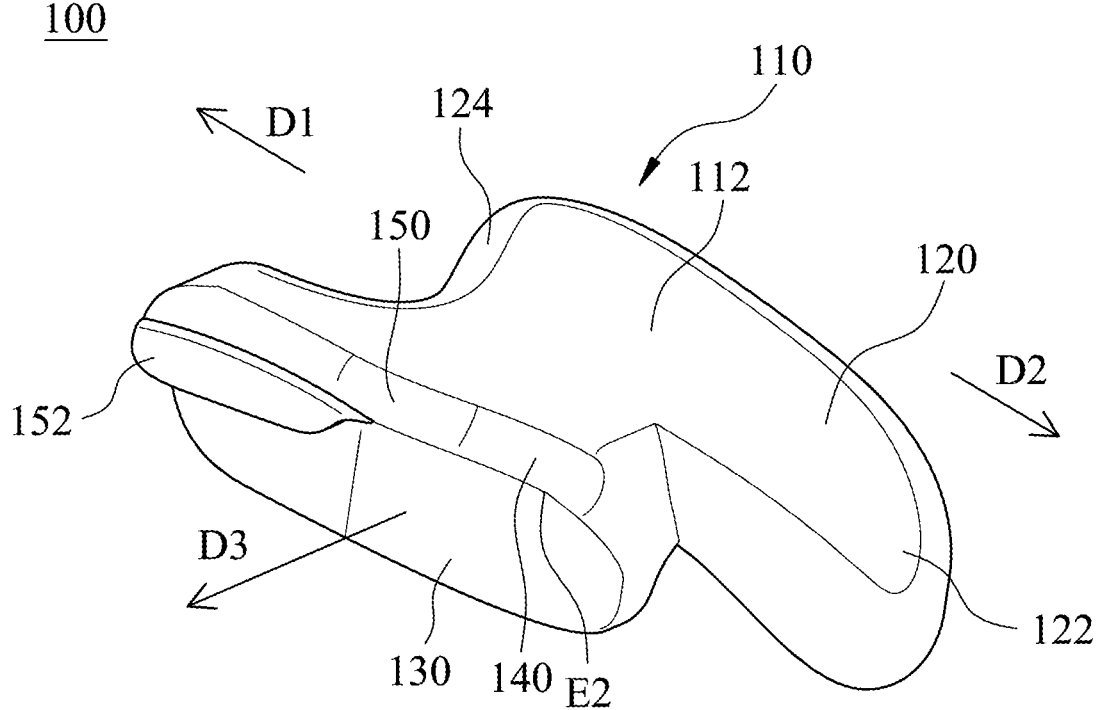
FIG. 1A is one schematic view of a tire assembling device according to one embodiment of the present disclosure.
Figure 1B:
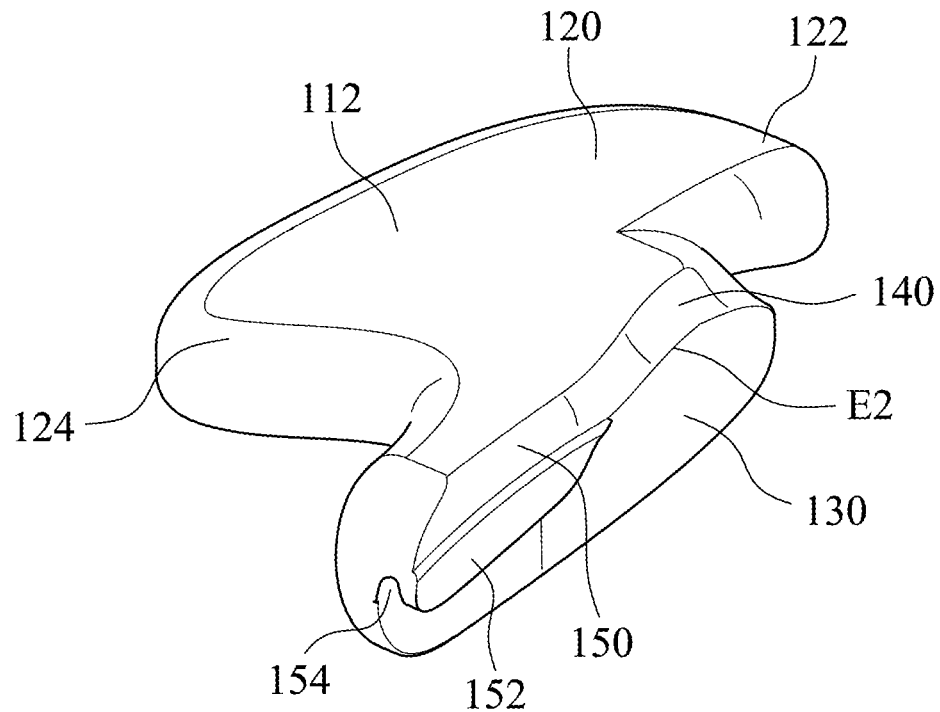
FIG. 1B is another schematic view of the tire assembling device of FIG. 1A.

FIG. 1A is one schematic view of a tire assembling device 100 according to one embodiment of the present disclosure. FIG. 1B is another schematic view of the tire assembling device 100 of FIG. 1A. In FIGS. 1A and 1B, the tire assembling device 100 is used to install a tire, e.g., a tubeless tire, on a rim, and includes a main body 110, a holding portion 120, an abutting surface 130, a guiding portion 140, a pressing portion 150 and a protrusion 152. The main body 110 has a top surface 112 located at a top side of the main body 110. The holding portion 120 is connected to one side of the main body 110. The holding portion 120 can be extended from the main body 110 toward a predetermined direction D2 to form a first sub-holding portion 122, and the holding portion 120 can be extended from the main body 110 toward a reference direction D1 to form a second sub-holding portion 124. In the embodiment of FIG. 1A, a first size of the first sub-holding portion 122 can be larger than a second size of the second sub-holding portion 124 such that a user can use the tire assembling device 100 by pulling. The details will be described below.

The abutting surface 130 is disposed at another side of the main body 110 and for abutting against a rim surface of the rim. The guiding portion 140 is located between the abutting surface 130 and the top surface 112, and the guiding portion 140 is extended inclinedly corresponding to a radial direction of the rim. The pressing portion 150 is extended from the guiding portion 140 toward the reference direction D1, and the pressing portion 150 is protruded from the abutting surface 130 and connected to the top surface 112. The protrusion 152 is protruded from the pressing portion 150 and forms a hook portion 154. The hook portion 154 is for hooking a first edge of the rim. In the embodiment of FIG. 1A, the guiding portion 140 is connected between a second edge E2 of the abutting surface 130 and the top surface 112.

Figure 2A:
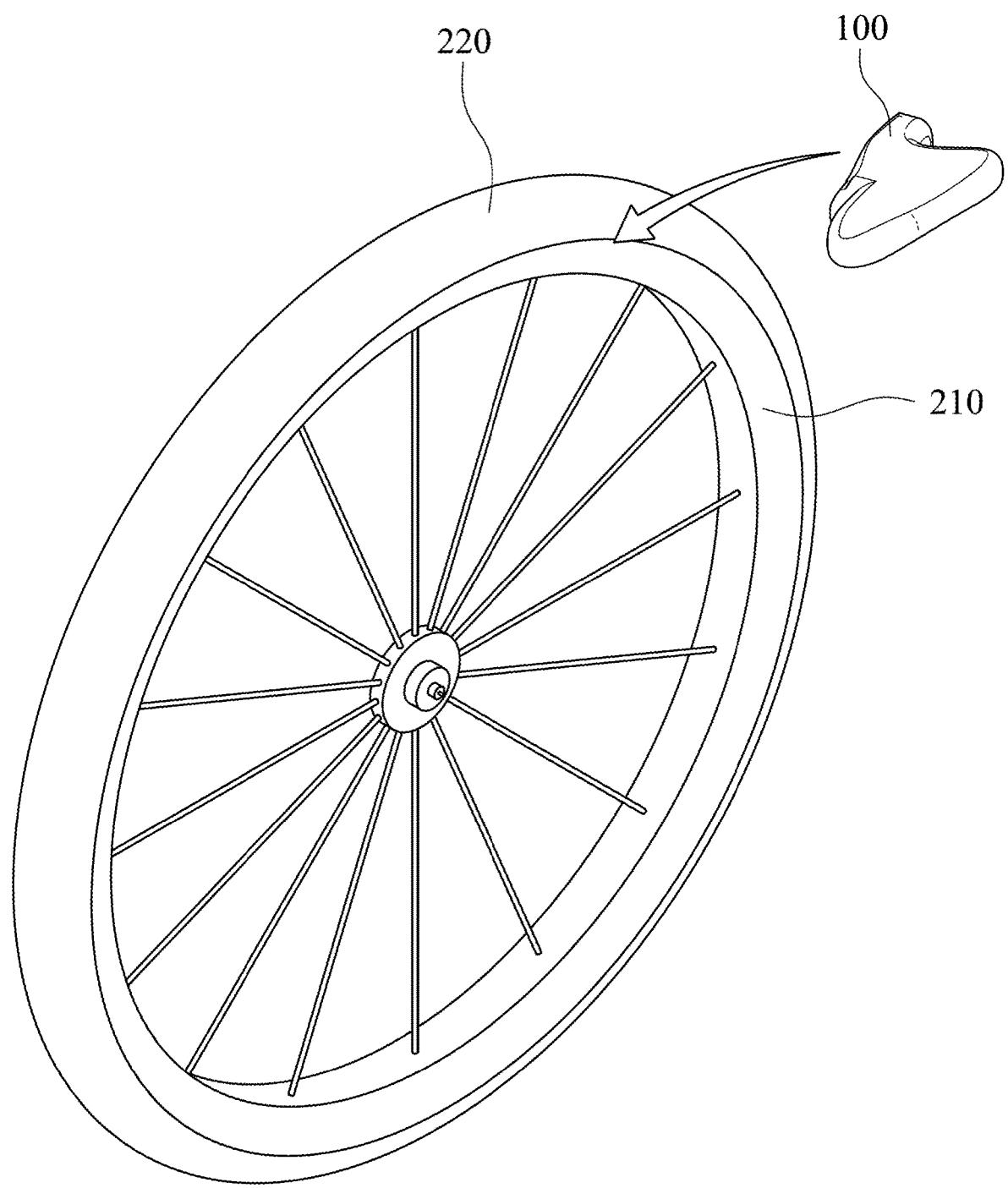
FIG. 2A is a schematic view showing a tire assembling device applied to install a tire on a rim according to another embodiment of the present disclosure.
Figure 2B:
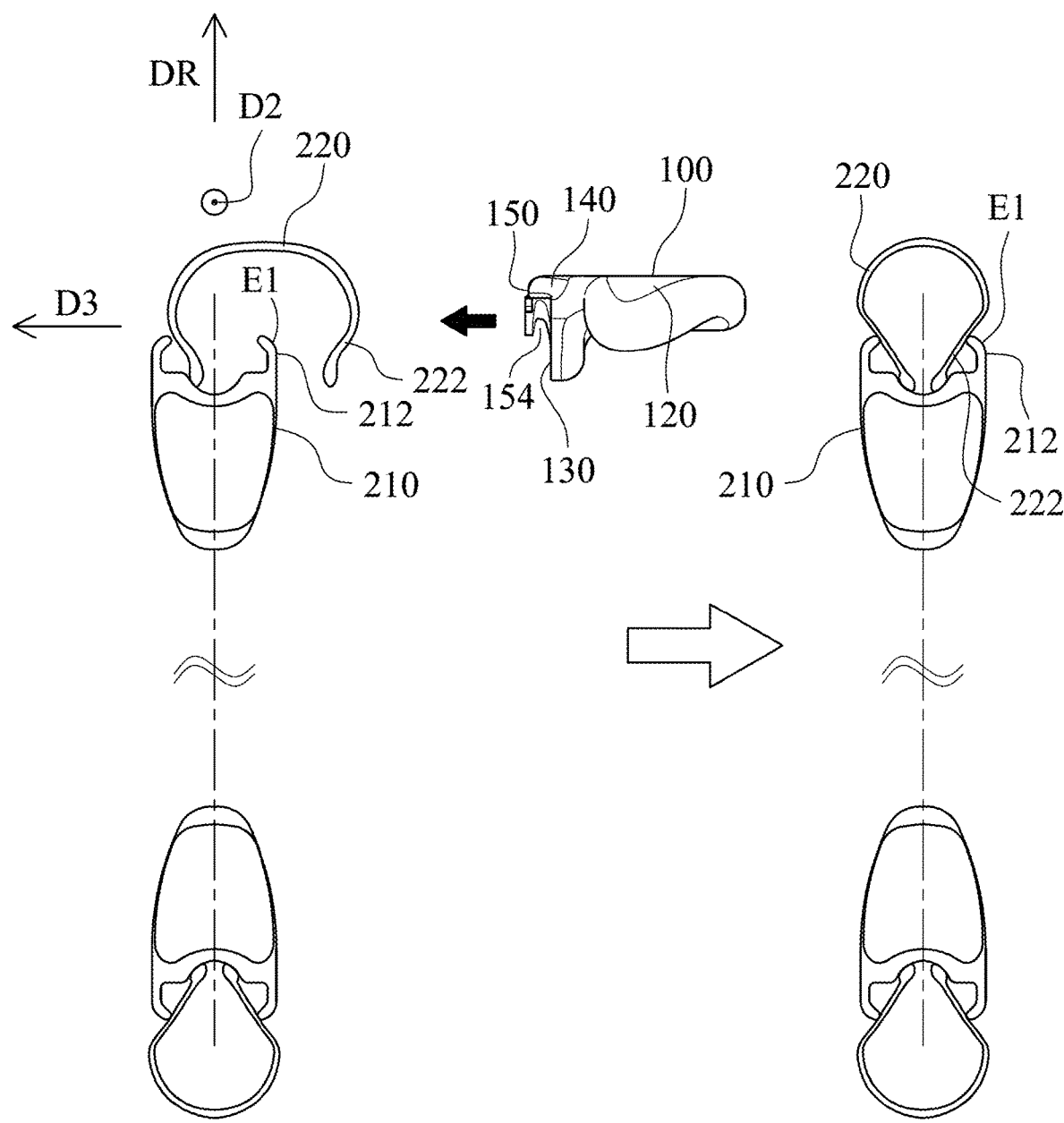
FIG. 2B is a schematic view showing the installation condition of FIG. 2A.

FIG. 2A is a schematic view showing a tire assembling device 100 applied to install a tire 220 on a rim 210 according to another embodiment of the present disclosure. FIG. 2B is a schematic view showing the installation condition of FIG. 2A. In FIGS. 2A and 2B, when the user would like to install the tire 220, e.g., a tubeless tire, on the rim 210, the user can use the hook portion 154 of the tire assembling device 100 to hook a first edge E1 of the rim 210 such that the abutting surface 130 can be abutted against a rim surface 212 of the rim 210. Subsequently, the user can hold the holding portion 120 by the right hand and pull the tire assembling device 100 along the first edge E1 toward the predetermined direction D2. In the embodiment of FIG. 2B, the predetermined direction D2 can be opposite to the reference direction D1 (as shown in FIG. 1A).

When the tire assembling device 100 is hooked on the first edge E1 of the rim 210 by the hook portion 154 and is moved toward the predetermined direction D2 along the first edge E1, the guiding portion 140 guides a tire bead 222 of the tire 220 toward a radial direction DR of the rim 210, and the pressing portion 150 pushes the tire bead 222 toward a normal direction D3 of the abutting surface 130 to guide the tire 220 to be installed on the rim 210, as shown in a right side of FIG. 2B.

By hooking the rim 210 via the hook portion 154 and abutting the rim surface 212 via the abutting surface 130, a displacement perpendicular to the rim surface 212 of the tire assembling device 100 can be avoided during the installation of the tire 220, which can improve the operation stability of tire assembling device 100. Additionally, when the tire assembling device 100 is moved along the first edge E1, the tire 220 can be installed on the rim 210 without damage through the guide of the guiding portion 140 and the press of the pressing portion 150. Consequently, the decrease of the performance of the entire tire 220 owing to improper installation can be prevented. Moreover, with the configuration of the guiding portion 140 and the pressing portion 150, the user can spend less power to install the tire bead 222 into the rim 210, which also increase the installing efficiency.

In other embodiment, the type of the holding portion 120 can be changed such that the tire assembling device 100 can be moved along the rim 210 by pushing. For example, the first size of the first sub-holding portion 122 can be smaller than the second size of the second sub-holding portion 124. The user can stand on the opposite side of the view and holds the holding portion 120 by the left hand to move the tire assembling device 100 along the first edge E1 toward the predetermined direction D2 such that the tire 220 can be installed.

Base on the principle and operation of the abovementioned embodiments, the present disclosure provides another tire assembling device 300 which is described in detail below.

Figure 3A:
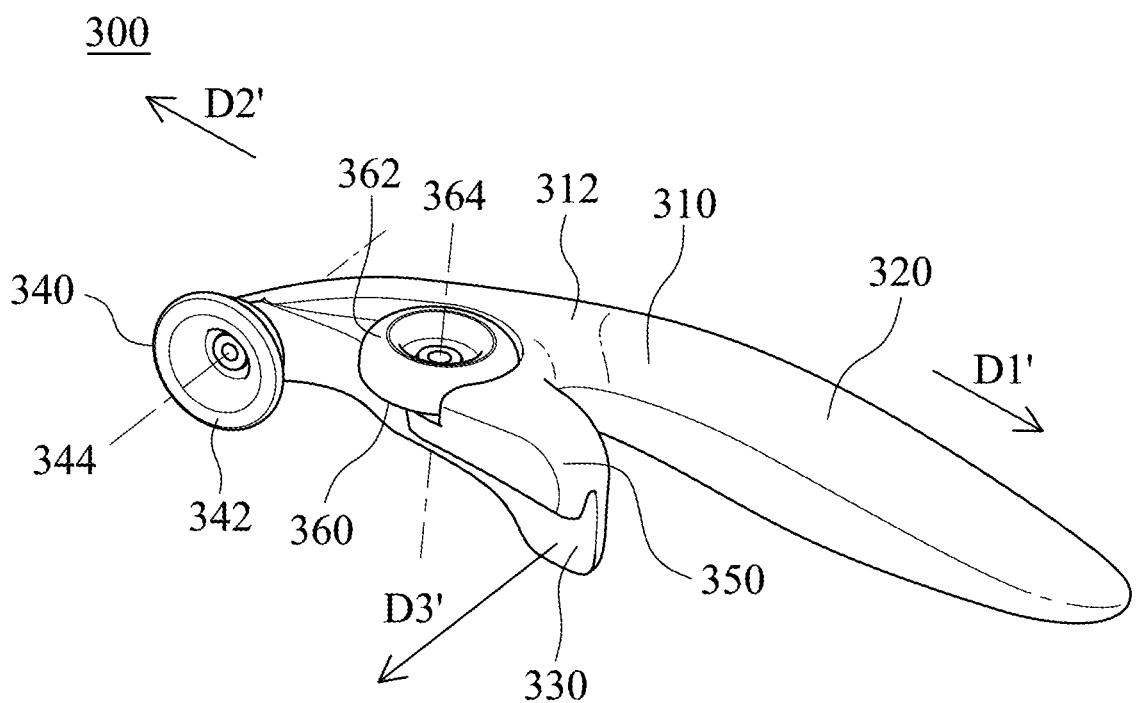
FIG. 3A is one schematic view of a tire assembling device according to yet another embodiment of the present disclosure.
Figure 3B:
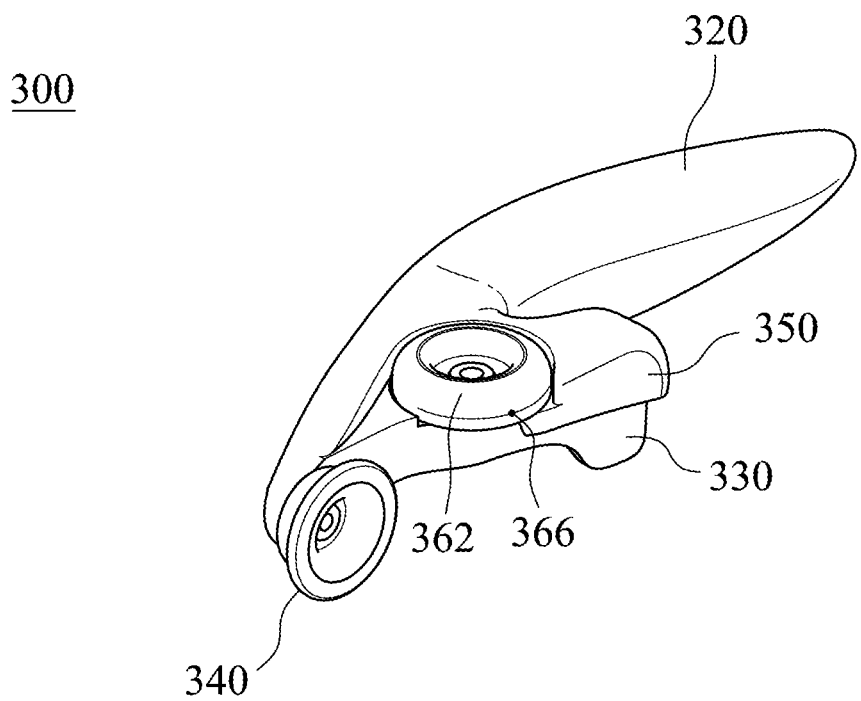
FIG. 3B is another schematic view of the tire assembling device of FIG. 3A.
Figure 3C:
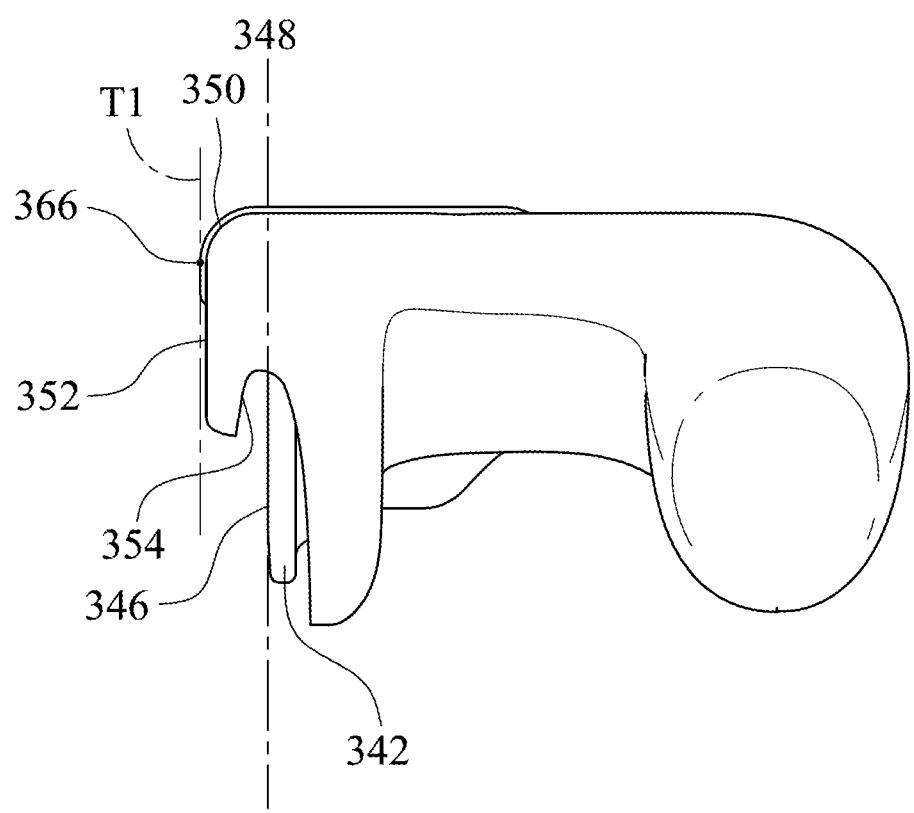
FIG. 3C is a side view of the tire assembling device of FIG. 3A.

FIG. 3A is one schematic view of a tire assembling device 300 according to yet another embodiment of the present disclosure. FIG. 3B is another schematic view of the tire assembling device 300 of FIG. 3A. FIG. 3C is a side view of the tire assembling device 300 of FIG. 3A. In FIGS. 3A, 3B and 3C, the tire assembling device 300 is for installing a tire, e.g., a tubeless tire, on a rim and includes a main body 310, a holding portion 320, a abutting surface 330, a guiding portion 340, a hook portion 350 and a pressing portion 360.

The main body 310 has a top surface 312 located on a top side of the main body 310. The holding portion 320 is extended from one side of the main body 310 toward a reference direction D1'. The abutting surface 330 is located at another side of the main body 310 and for abutting against a rim surface of the rim.

The guiding portion 340 is located at one end of the main body 310. In the embodiment of FIG. 3A, the guiding portion 340 can include a first pulley 342 pivotally connected to the end of the main body 310 via a first axis 344. The hook portion 350 can be located between the abutting surface 330 and the top surface 312, and the hook portion 350 is for hooking a first edge of the rim. The pressing portion 360 is disposed at the main body 310 and located between the hook portion 350 and the guiding portion 340. The pressing portion 360 is for providing a force, and a direction of the force is parallel to a normal direction D3' of the abutting surface 330. In the embodiment of FIG. 3A, the pressing portion 360 can include a second pulley 362 pivotally connected to the main body 310 through a second axis 364 which is perpendicular to the first axis 344.

In the embodiment of FIG. 3C, the hook portion 350 has a side surface 352. The second pulley 362 is touched to the tire bead at a touching point 366, and a tangential plane T1 of the touching point 366 is aligned with the side surface 352. Moreover, the hook portion 350 can include a groove 354 for hooking the first edge E1' of the rim 410 (as shown in FIG. 4B), and a reference surface 348 defined by a pulley surface 346 of the first pulley 342 passes through the groove 354.

Figure 4A:
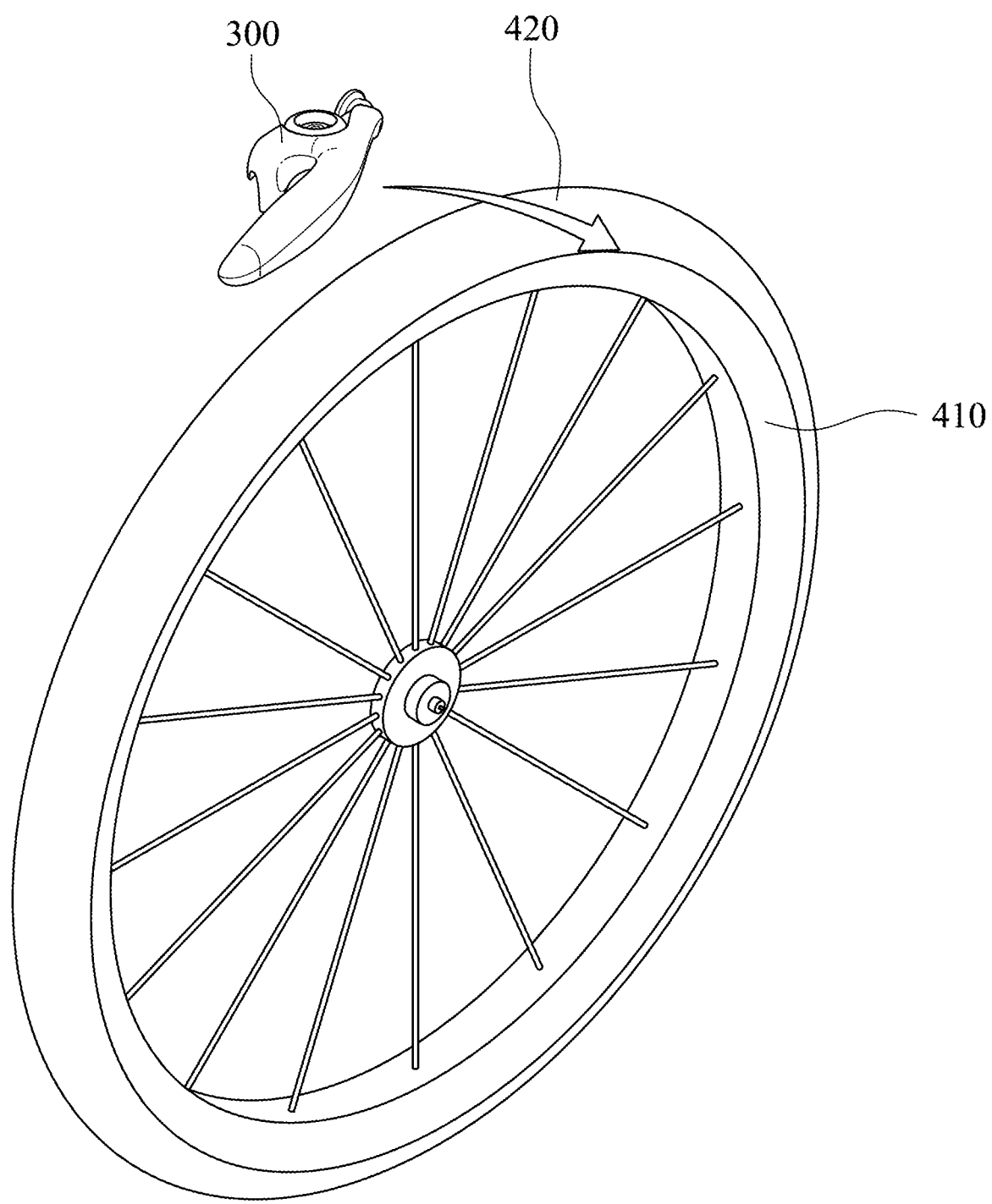
FIG. 4A is a schematic view showing a tire assembling device applied to install a tire on a rim according to still yet another embodiment of the present disclosure.

FIG. 4A is a schematic view showing a tire assembling device 300 applied to install a tire 420 on a rim 410 according to still yet another embodiment of the present disclosure. FIG. 4B is a schematic view showing the installation condition of FIG. 4A. In FIGS. 4A and 4B, when the user would like to install the tire 420, e.g., a tubeless tire, to the rim 410, the user can use the hook portion 350 of the tire assembling device 300 to hook a first edge E1' of the rim 410 such that the abutting surface 330 can be abutted against a rim surface 412 of the rim 410. Subsequently, the user can hold the holding portion 320 by the right hand and push the tire assembling device 300 along the first edge E1' toward a predetermined direction D2'. In the embodiment of FIG. 4B, the predetermined direction D2' can be opposite to the reference direction D1' (as shown in FIG. 3A).

Figure 4B:
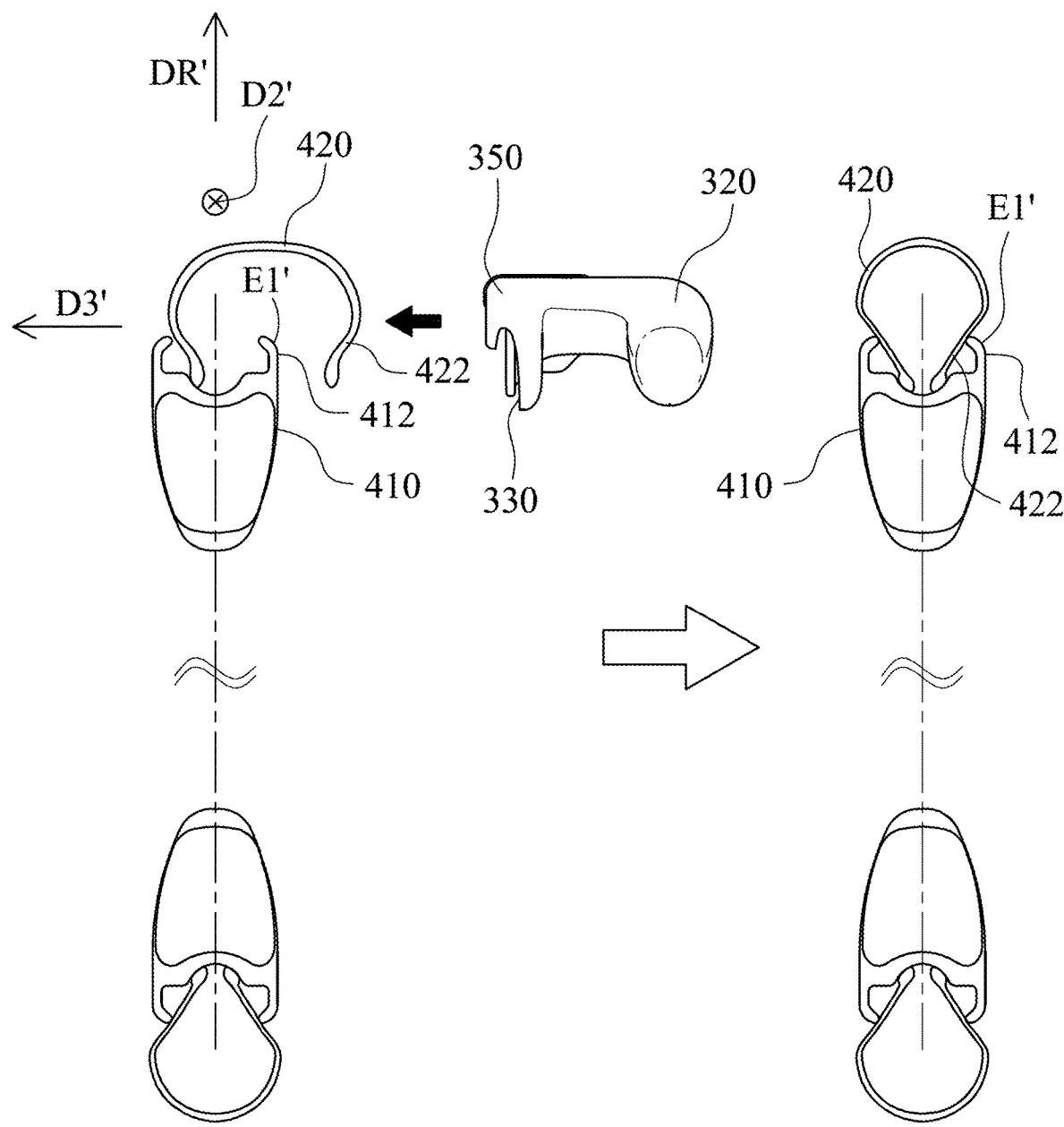
FIG. 4B is a schematic view showing the installation condition of FIG. 4A.

When the tire assembling device 300 is hooked on the first edge E1' of the rim 410 by the hook portion 350 and is moved toward the predetermined direction D2' along the first edge E1', the guiding portion 340 guides a tire bead 422 of the tire 420 toward a radial direction DR' of the rim 410, and the pressing portion 360 pushes the tire bead 422 toward the normal direction D3' of the abutting surface 330 to guide the tire 420 to be installed on the rim 410, as shown in a right side of FIG. 4B.

By hooking the rim 410 via the hook portion 350 and abutting the rim surface 412 via the abutting surface 330, a displacement perpendicular to the rim surface 412 of the tire assembling device 300 can be avoided during the installation of the tire 220, so as to improve the operation stability of tire assembling device 300. Additionally, when the tire assembling device 300 is moved along the first edge E1', the tire 420 can be installed on the rim 410 without damage through the guide of the guiding portion 340 and the press of the pressing portion 360. Consequently, the decrease of the performance of the entire tire 420 owing to improper installation can be prevented. With the configuration of the guiding portion 340 and the pressing portion 360, the user can spend less power to install the tire bead 422 into the rim 410, which also increase the installing efficiency.

Moreover, when the guiding portion 340 includes the first pulley 342, a friction between the guiding portion 340 and the rim 410 is decreased such that the tire assembling device 300 can be moved along the first edge E1' more smoothly. Furthermore, when the pressing portion 360 includes the second pulley 362, a friction between the pressing portion 360 and the tire bead 422 is decreased such that the tire bead 422 can be guided into the rim 410 more easily.

In other embodiment, the holding portion 320 can be changed such that the tire assembling device 300 can be moved along the rim 410 by pulling. For example, the holding portion 320 can be extended from the reference direction D1' which is the same as the predetermined direction D2'; thus, when the tire assembling device 300 is applied to install a tire as shown is FIG. 4B, the user can stand on the opposite side of the view and hold the holding portion 320 by the left hand to move the tire assembling device 300 toward the predetermined direction D2' along the first edge E1' to install the tire 420.

Base on the above embodiments, by the configuration of the guiding portion and the pressing portion to guide and press the tire respectively, the tire assembling device of the present disclosure can assist installation of the tire, and the tire can be installed on the rim without damaging the tire bead and the airtight layer thereof; thus, the decrease of the performance of the entire tire owing to improper installation can be prevented. Additionally, the user can spend less power to install the tire bead into the rim, which also increase the installing efficiency.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A tire assembling device, which is for installing a tire on a rim, the tire assembling device comprising:
   a main body having a top surface located at a top side of the main body;
   a holding portion connected to one side of the main body;
   an abutting surface connected to another side of the main body and for abutting against a rim surface of the rim;
   a guiding portion located between the abutting surface and the top surface, the guiding portion extended inclinedly corresponding to a radial direction of the rim;
   a pressing portion directly and integrally extended from the guiding portion toward a reference direction, wherein the pressing portion is located between the abutting surface and the top surface, and the pressing portion and the guiding portion are connected to form a continuous surface inclining to the radial direction of the rim; and
   a protrusion protruded from an edge of the pressing portion to form a hook portion, wherein the hook portion is for hooking a first edge of the rim;
   wherein when the tire assembling device is hooked on the first edge of the rim by the hook portion and is moved toward a predetermined direction along the first edge, the guiding portion guides a tire bead of the tire toward the radial direction of the rim, and the pressing portion pushes the tire bead toward a normal direction of the abutting surface to guide the tire to be installed on the rim.

2. The tire assembling device of claim 1, wherein the guiding portion is connected between a second edge of the abutting surface and the top surface.

3. The tire assembling device of claim 1, wherein the predetermined direction is opposite to the reference direction.

4. The tire assembling device of claim 3, wherein the holding portion is extended from the main body toward the predetermined direction to form a first sub-holding portion, and the holding portion is extended from the main body toward the reference direction to form a second sub-holding portion.

5. The tire assembling device of claim 4, wherein a first size of the first sub-holding portion is larger than a second size of the second sub-holding portion.

6. The tire assembling device of claim 4, wherein a first size of the first sub-holding portion is smaller than a second size of the second sub-holding portion.

7. A tire assembling device, which is for installing a tire on a rim, the tire assembling device comprising:
   a main body having a top surface located on a top side of the main body;
   a holding portion extended from one side of the main body toward a reference direction;
   an abutting surface located at another side of the main body and for abutting against a rim surface of the rim;
   a guiding portion located at one end of the main body, the guiding portion comprising a first pulley pivotally connected to the end of the main body via a first axis;
   a hook portion located between the abutting surface and the top surface, wherein the hook portion is for hooking a first edge of the rim and has a side surface; and
   a pressing portion disposed at the main body and located between the hook portion and the guiding portion, the pressing portion comprising a second pulley pivotally connected to the main body via a second axis which is perpendicular to the first axis, the pressing portion for providing a force, wherein a direction of the force is parallel to a normal direction of the abutting surface;
   wherein when the tire assembling device is hooked on the first edge of the rim by the hook portion and is moved toward a predetermined direction along the first edge, the guiding portion guides a tire bead of the tire toward a radial direction of the rim, the pressing portion pushes the tire bead toward the normal direction of the abutting surface to guide the tire to be installed on the rim, the second pulley is touched to the tire bead at a touching point, and a tangential plane of the touching point is aligned with the side surface.

8. The tire assembling device of claim 7, wherein the hook portion comprises:
   a groove for hooking the first edge of the rim;
   wherein a reference surface defined by a pulley surface of the first pulley passes through the groove.

9. The tire assembling device of claim 7, wherein the predetermined direction is opposite to the reference direction.

10. The tire assembling device of claim 7, wherein the predetermined direction is the same as the reference direction.

* * * * *